United States Patent [19]
Owen

[11] Patent Number: 5,731,971
[45] Date of Patent: Mar. 24, 1998

[54] APPARATUS FOR PROVIDING MULTIPLE, PHASE-SHIFTED POWER OUTPUTS

[76] Inventor: Donald W. Owen, 5100 NW. 26th St., Oklahoma City, Okla. 73127

[21] Appl. No.: 688,708

[22] Filed: Jul. 31, 1996

[51] Int. Cl.⁶ .................................................. H02M 5/06
[52] U.S. Cl. ........................................... 363/154; 363/3
[58] Field of Search ................................ 323/215; 363/3, 363/152, 153, 154

[56] References Cited

U.S. PATENT DOCUMENTS

| | | | |
|---|---|---|---|
| 2,307,527 | 1/1943 | Maslin et al. | 172/238 |
| 2,812,488 | 11/1957 | Wright | 323/47 |
| 3,026,467 | 3/1962 | Barnes | 321/5 |
| 3,036,258 | 5/1962 | Friedrich | 321/5 |
| 3,339,107 | 8/1967 | Aldenhoff | 315/141 |
| 3,445,747 | 5/1969 | Laurent | 321/5 |
| 3,711,760 | 1/1973 | Kaiser | 321/5 |
| 3,769,570 | 10/1973 | Stairs | 321/9 R |
| 4,106,089 | 8/1978 | Fettinger | 363/153 |
| 4,255,784 | 3/1981 | Rosa | 363/129 |
| 4,493,016 | 1/1985 | Cham et al. | 363/126 |
| 4,565,953 | 1/1986 | Espelage et al. | 318/345 E |
| 4,712,054 | 12/1987 | Boldt | 318/758 |
| 4,713,554 | 12/1987 | Henderson | 307/64 |
| 4,713,744 | 12/1987 | Coston | 363/160 |
| 4,761,726 | 8/1988 | Brown | 363/51 |
| 4,833,588 | 5/1989 | Schauder | 363/159 |
| 4,870,558 | 9/1989 | Luce | 363/87 |
| 4,876,634 | 10/1989 | Paice | 363/5 |
| 4,931,715 | 6/1990 | Lee et al. | 318/709 |
| 4,948,209 | 8/1990 | Baker et al. | 322/10 |
| 5,050,058 | 9/1991 | April et al. | 363/65 |
| 5,055,762 | 10/1991 | Disser et al. | 318/811 |
| 5,068,774 | 11/1991 | Rosa | 363/3 |
| 5,079,499 | 1/1992 | Owen | 323/361 |
| 5,130,628 | 7/1992 | Owen | 318/789 |

FOREIGN PATENT DOCUMENTS

| | | | |
|---|---|---|---|
| 1070-670-A | 1/1984 | U.S.S.R. | H02M 7/08 |

OTHER PUBLICATIONS

"Harmony Series Instruction Manual–Theory of Operation", Halmar-Robicon (circa Mar. 19, 1994).

"Lowering harmonic distortion in ac drives", *Machine Design*, Dec. 12, 1994, pp. 124–126.

Primary Examiner—Jeffrey L. Sterrett
Attorney, Agent, or Firm—Dougherty & Hessin, P.C.

[57] ABSTRACT

An apparatus provides multiple, phase-shifted power outputs, such as for driving a rectifier circuit of an electronic frequency converter. The apparatus connects to a multi-phase power source having a predetermined number of phases, such as a conventional three-phase alternating current source provided by a public utility. The apparatus causes a first phase shift in response to current flow from the power source through the input of the apparatus. The apparatus also includes an output. The output is responsive to current flow through the input such that the apparatus causes a second phase shift and provides multiple power outputs of different phases in response to the first and second phase shifts. The output of the apparatus includes at least two closed circuit winding groups. One closed circuit winding group is electrically phase shifted relative to another closed circuit winding group by the first phase shift, and each closed circuit winding group provides respective phase power outputs electrically phase shifted within itself by the second phase shift.

19 Claims, 2 Drawing Sheets

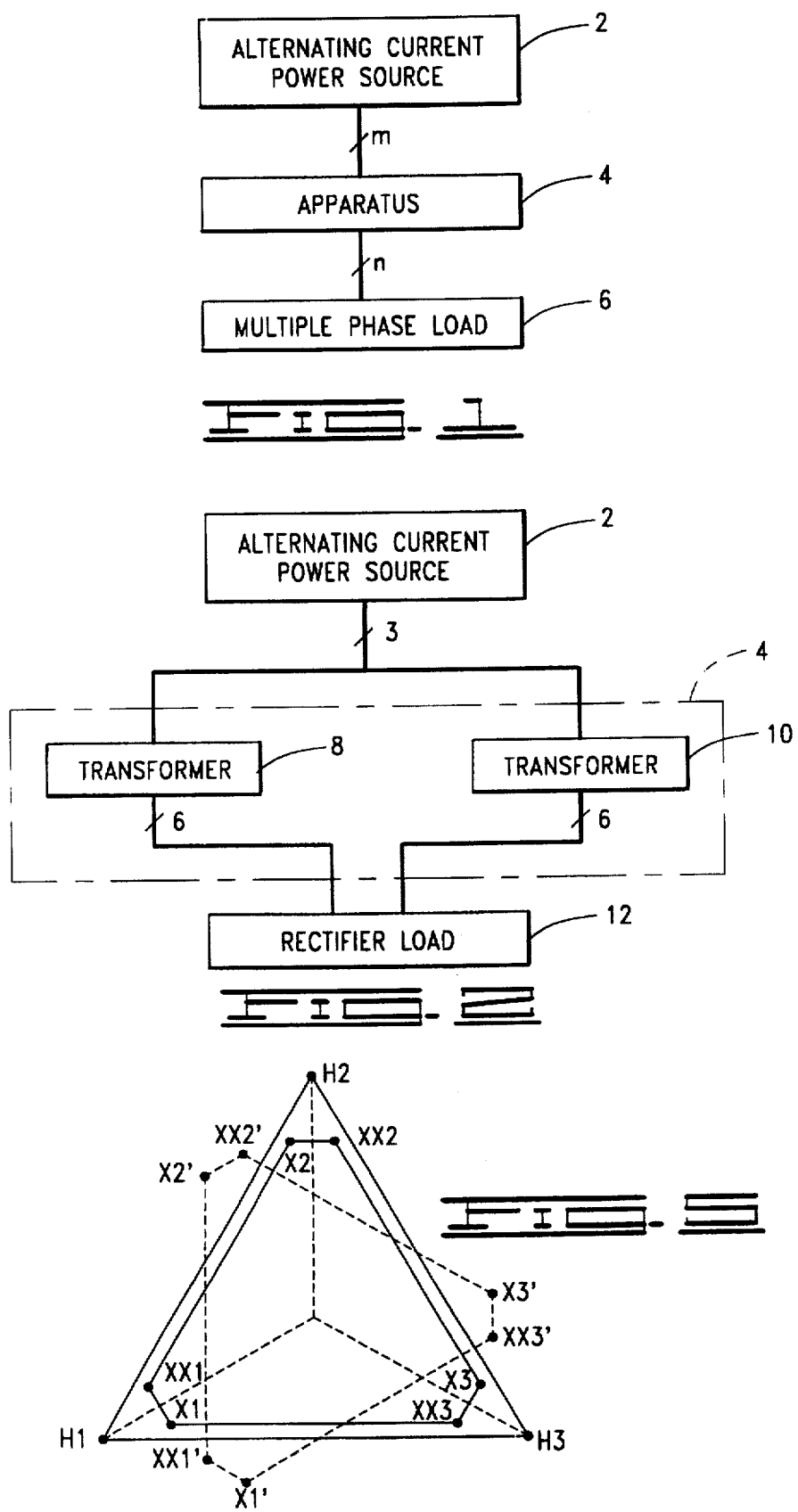

APPARATUS FOR PROVIDING MULTIPLE, PHASE-SHIFTED POWER OUTPUTS

BACKGROUND OF THE INVENTION

This invention relates generally to apparatus for providing multiple, phase-shifted power outputs, such as a twelve-phase output from a three-phase input.

One technique for controlling the speed of a three-phase induction motor uses an electronic frequency controller. The frequency controller has a rectifier circuit that requires multiple phases of alternating current electric power. The rectifier circuit full-wave rectifies each phase of the input power to provide the requisite number of pulses needed by the frequency converter. For example, a twenty-four-pulse frequency converter needs twelve phases of electric power to be input to the rectifier circuit so that twenty-four pulses are provided by the full-wave rectification. Since conventional, readily available power sources only have three phases of electric power, there is the need for an apparatus that can provide the greater number of phases needed for frequency converters of the type referred to above or for other purposes.

Although the foregoing is well-known in at least the field referred to in the preceding paragraph, there is still the need for a relatively simple apparatus which can provide the necessary phases of alternating current electric power such as for use by a rectifier circuit of an electronic frequency converter and yet which facilitates relatively easy and economical manufacturing.

SUMMARY OF THE INVENTION

The present invention, which is a novel and improved apparatus for providing multiple, phase-shifted power outputs, meets the aforementioned needs. The present invention is relatively simple and facilitates relatively easy and economical manufacturing.

The apparatus of the present invention comprises input means for connecting to a multi-phase power source having a predetermined number of phases and for causing a first phase shift in response to current flow from the power source through the input means. The apparatus also includes output means, responsive to current flow through the input means, for causing a second phase shift and for providing multiple power outputs of different phases in response to the first and second phase shifts. The output means includes at least two closed circuit winding groups. One closed circuit winding group is electrically phase shifted relative to another closed circuit winding group by the first phase shift, and each closed circuit winding group provides respective phase power outputs electrically phase shifted within the respective closed circuit winding group by the second phase shift.

In a particular implementation, the present invention is an apparatus for providing a twelve-phase power output. This apparatus comprises first and second transformers with each transformer providing a respective set of six different phase outputs. The first transformer includes a delta-connected primary winding circuit, and it also includes means for connecting the delta-connected primary winding circuit to a three-phase power source. The first transformer still further includes a polygon-vector secondary winding group electromagnetically coupled with the delta-connected primary winding circuit. The secondary winding group of the first transformer provides two three-phase outputs shifted about fifteen electrical degrees relative to each other in response to three-phase current flow through the delta-connected primary winding circuit from the three-phase power source. As to the second transformer of this implementation, it includes a wye-connected primary winding circuit and means for connecting the wye-connected primary winding circuit to the three-phase power source. The second transformer further includes a polygon-vector secondary winding group electromagnetically coupled with the wye-connected primary winding circuit. The secondary winding group of the second transformer provides two three-phase outputs shifted about fifteen electrical degrees relative to each other in response to three-phase current flow through the wye-connected primary winding circuit from the three-phase power source. Further, the two three-phase outputs of the second transformer are shifted about thirty electrical degrees relative to the two three-phase outputs of the first transformer.

Therefore, from the foregoing, it is a general object of the present invention to provide a novel and improved apparatus for providing multiple, phase-shifted power outputs. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is a block diagram of a general system in which the present invention can be used.

FIG. 2 is a block diagram of a specific system in which the present invention can be used and of a two-transformer embodiment of the apparatus of the present invention.

FIG. 5 is a superimposed vector diagram for the implementation of FIG. 3.

DETAILED DESCRIPTION OF PREFERRED EMBODIMENTS

Figure 3:
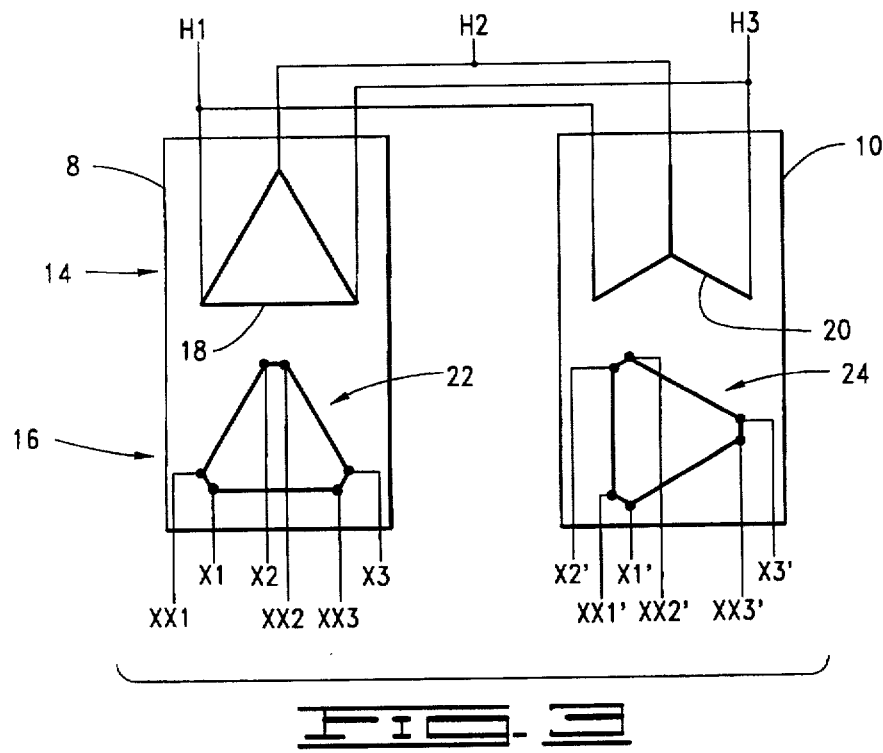
FIG. 3 is a vector diagram and schematic winding representation for one implementation of the two-transformer embodiment of the present invention.

An example of the system in which the apparatus of the present invention can be used is illustrated in FIG. 1. An alternating current power source 2 provides a predetermined number of phases of electric power. In FIG. 1, "m" phases of power are indicated. These are connected to inputs of an apparatus 4 for providing multiple, phase-shifted power outputs in accordance with the present invention. As represented in FIG. 1, "n" different phases of power outputs are provided from the apparatus 4. The number of different phases of outputs, "n", provided by the apparatus 4 is greater than the number of different phases of power inputs, "m".

The outputs of the apparatus 4 are connected as inputs to a multiple phase load 6.

An example of a specific system and a preferred embodiment of the present invention are shown in FIG. 2. The FIG. 2 system includes the power source 2 implemented by a conventional three-phase power source such as from a public utility. The voltage of such source can be as desired, but one example of the voltage level applied at the input of a particular implementation of the present invention, and thus provided at the output of the source 2, is 13,800 volts(ac).

The apparatus 4 of the present invention is shown in FIG. 2 embodied as a combination of two transformers 8, 10. In the particular implementations described below, each transformer provides two different three-phase outputs with the two sets of outputs of one transformer phase shifted relative to the two sets of the other transformer. Thus, the two transformers 8, 10 of these implementations provide means for creating four, three-phase alternating current power outputs utilizing a single three-phase alternating current power source connected to the inputs of both transformers 8, 10.

Still referring to FIG. 2, the generic multiple phase load 6 of FIG. 1 is specifically illustrated in FIG. 2 as a rectifier load 12. For the particular implementations to be described below, the rectifier load 12 can be a twenty-four-pulse rectifier which requires twelve different phases of input power. Such a rectifier can be used in variable speed drives for three-phase induction motors as referred to in the Background portion of this specification. Other examples of the rectifier load 12 that can be used with the particular implementations of the present invention described below include two twelve-pulse rectifiers or four six-pulse rectifiers. One three-phase output from one transformer 8, 10 and one three-phase output from the other transformer 8, 10 can be used as the six-phase input to one twelve-pulse rectifier, or each of the three-phase outputs of the transformer 8, 10 can be connected to a respective six-pulse rectifier. Connections can be such that the harmonic currents that flow in the rectifiers cancel at the common primary connection point and do not flow in the primary power source. Outputs from the transformers 8, 10 are cross-connected in the twelve-pulse and twenty-four-pulse applications such that both transformers are required in each of these uses (i.e., the six outputs from only one of the transformers are not alone sufficient for twelve-pulse rectification of the type referred to herein; a three-phase output from transformer 8 and a corresponding three-phase output from transformer 10 are needed for such twelve-pulse rectification).

Before further describing specific implementations of the present invention, a general description of the apparatus 4 will be given. In general, the apparatus 4 includes input means and output means. The input means connects to the multi-phase power source 2, and the input means causes a first phase shift to occur in response to current flow from the power source 2 through the input means. In the particular implementations described below, this first phase shift is about thirty electrical degrees.

The output means of the apparatus 4 responds to current flow through the input means and causes a second phase shift. The output means provides multiple power outputs of different phases in response to both the first phase shift and the second phase shift. This output means generally includes at least two (and preferably at most two for a twelve-phase implementation) closed circuit winding groups wherein one closed circuit winding group is electrically phase shifted relative to another closed circuit winding group by the first phase shift and wherein each closed circuit winding group provides respective power outputs electrically phase shifted within the respective winding group by the second phase shift. This means that as between two closed circuit winding groups, they are phase shifted relative to each other by the first phase shift, which is the about thirty electrical degrees referred to above with regard to the particular implementations of the preferred embodiment. As to the second phase shift, this is about fifteen electrical degrees in the particular implementations of the preferred embodiment described below, whereby one set of outputs of one closed circuit winding group is phase shifted about fifteen electrical degrees relative to another set of outputs of the same closed circuit winding group.

The terminology "closed circuit winding group" used above, and elsewhere in this specification and in the claims, refers to a group of one or more closed secondary winding circuits wherein each such secondary winding circuit includes distinct windings of electrical conductor material connected in electrical series such that a closed electric circuit is made by the respective windings of the particular secondary winding circuit. This is at least one secondary winding configuration which can produce outputs from the series-connected ends of the windings that may be represented by vector phase relationships graphically depicted by polygon-shaped diagrams to be described further below. Such a vector phase relationship is an important characteristic of the present invention, so the term "polygon-vector" is used in this specification and in the claims as an adjective defining a particular type of secondary winding circuit of the present invention in accordance with the foregoing and as further apparent from the following description of two particular implementations of the input and output means as depicted in FIGS. 3 and 4.

In FIG. 3, the input means of the apparatus 4 is generally identified by the reference numeral 14 and the output means is generally identified by the reference numeral 16. As to the input means 14, this includes respective primary winding circuits of the transformers 8, 10. The primary windings and connections of these circuits are arranged to cause the secondary outputs of one transformer to be phase shifted about thirty electrical degrees relative to the secondary outputs of the other transformer when the inputs of both primaries are connected to a common primary source. A preferred way to accomplish the about thirty electrical degree phase shift is for one primary winding circuit to be a conventional delta configuration, as represented by delta-connected primary winding circuit 18 in FIG. 3, and for the other primary to be a conventional wye-connected primary winding circuit as identified by the reference numeral 20 in FIG. 3. Each of the primaries 18, 20 is electromagnetically coupled with its respective closed circuit winding group of the output means 16.

The input means 14 represented in FIG. 3 also includes means for connecting the respective primary winding circuit to the same power source such as, for the FIG. 3 implementation, the three-phase power source 2 shown in FIG. 2. The means for connecting includes terminals H1, H2 and H3 shown in FIG. 3, and it may also include suitable switching to allow for different input voltages to be accommodated. Such switching in the input means would be of a type as known in the art to maintain the output voltage level while accommodating variations in the voltage applied to the input.

Figure 4:
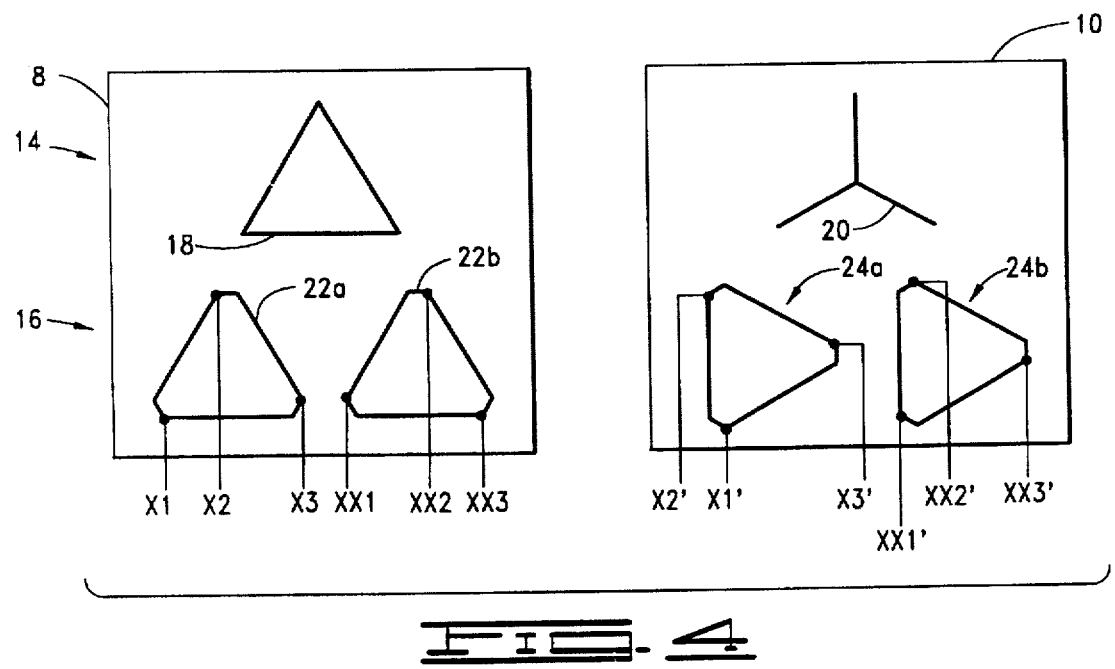
FIG. 4 is a vector diagram and schematic winding representation for another implementation of the two-transformer embodiment of the present invention.

Referring to the FIG. 4 implementation, the input means 14 is constructed the same as in the FIG. 3 implementation so that it will not be further described. It is to be noted, however, that other configurations of primary construction can be used. The only requirement of principal concern to the present invention is that a desired first phase shift occurs in the outputs due to the input means 14. With regard to the specific implementations producing a thirty degree phase shift, it is contemplated that closed circuit primary windings having polygonal vector diagrams or winding configurations having zigzag connections can be used in the input means.

Regarding the output means, two different implementations are shown in FIGS. 3 and 4; however, each of these includes a respective closed circuit winding group in each transformer 8, 10.

In the FIG. 3 implementation, each closed circuit winding group includes a respective single closed secondary winding circuit; the one in the transformer 8 is marked with the reference number 22, and the one in the transformer 10 is marked with the reference number 24 (the polygonal diagrams in FIG. 3 are not representations of the physical dispositions of the windings of the circuits 22, 24, but rather are depictions of the vector phase diagram for each respective winding circuit; but each such winding circuit includes greater and fewer turn windings represented in their electrical phase relationships by the longer and shorter sides of the polygons). Each of these secondaries is electromagnetically coupled with the respective primary winding circuit 18, 20 (e.g., by being wound on a common core for a respective primary and secondary). In the implementation of FIG. 3, the secondary winding circuit of each transformer includes only one set of six serially connected windings with six output terminals. Each terminal is physically connected to a respective junction between two windings such that the terminal is represented at a respective corner or node of the polygonal vector diagrams of FIG. 3. A combined vector phase diagram representing the relationship between the primaries and secondaries of the transformers 8, 10 of FIG. 3 is shown in FIG. 5. An example of one way to implement this type of secondary is disclosed in U.S. Pat. No. 5,079,499, incorporated herein by reference for all purposes.

Also shown in FIG. 3 are the twelve outputs X, XX, X' and XX' provided by the two secondary winding groups of the transformers 8, 10. The three-phase output X1, X2, X3 is out of phase with three-phase output XX1, XX2, XX3. In the same manner, three-phase output X1', X2', X3' is out of phase with three-phase output XX1', XX2', XX3'. These are out of phase by the aforementioned fifteen electrical degrees in the illustrated particular implementations (i.e., X1 and XX1 are fifteen degrees out of phase, X1' and XX1' are fifteen degrees out of phase, and X2 and XX2 are fifteen degrees out of phase, etc.). The two three-phase outputs X1, X2, X3; XX1, XX2, XX3 are out of phase with the two three-phase outputs X1', X2', X3'; XX1', XX2', XX3' by the aforementioned thirty electrical degrees for the particular implementations described herein (i.e., X1 and X1' are thirty degrees out of phase, XX1 and XX1' are thirty degrees out of phase, etc.). This is depicted in the diagram of FIG. 5.

The FIG. 3 implementation lends itself more to use with simple diode rectifiers and less to phase-controlled rectifiers such as silicon-controlled rectifiers.

Referring to FIG. 4, each respective secondary winding group of this implementation includes a respective pair of electrically isolated closed secondary winding circuits. One pair is represented by the polygonal vector phase diagrams 22a, 22b, and the other pair is represented by the polygonal vector phase diagrams 24a, 24b in FIG. 4. Each has output terminals connected symmetrically within the respective set of serially connected windings defining one secondary winding circuit, but asynchronously to the other isolated set of six serially connected windings. This implementation lends itself to phase-controlled rectifiers or to simple diode rectifiers. Each of these secondary winding circuits includes six series-connected windings just as in the implementation of FIG. 3. These, too, can be implemented as illustrated in U.S. Pat. No. 5,079,499. The sequencing of the outputs labeled in FIG. 4 is the same as in FIG. 3; however, each of the sets of three-phase outputs is electrically isolated from the others.

In the particular implementations of the present invention wherein a fifteen electrical degree phase shift is desired between the two three-phase outputs of a single one of the transformers 8, 10, the turns ratio between two serially connected windings within each secondary winding circuit theoretically is (sin 52.5°/sin 7.5°):1, which is approximately 6.078:1. In an actual transformer, however, windings are typically wound to integer multiples of half turns; therefore, in practice the turns ratio needs to be "about" (sin 52.5°/sin 7.5°):1. One example of what constitutes "about" this ratio (and thereby to achieve an "about" fifteen degree phase shift) includes 18 turns for each of the windings represented by the longer sides of the phase diagrams in FIGS. 3–5 and 3 turns for each of the other windings, which gives a ratio of 6.000:1 (within 13 parts in 1,000 of the desired theoretical ratio). Another example is 39.5 turns for each of the windings represented by the longer sides of the phase diagrams in FIGS. 3–5 and 6.5 turns for each of the other windings, providing a ratio of approximately 6.077:1 (within 2 parts in 10,000 of the desired theoretical ratio). A vector diagram showing both the particular thirty degree phase relationship between the outputs of the transformers 8, 10 and the fifteen degree phase relationship between the two three-phase outputs of each transformer 8, 10 is shown in FIG. 5.

Because of the serial connection of the six windings of each secondary winding circuit in the embodiment of FIG. 3, the full load rating of each transformer can be accommodated by any single three-phase output provided through any set of three associated output terminals (i.e., any one of sets X1-X3, XX1-XX3, X1'-X3', XX1'-XX3'). In the embodiment of FIG. 4, full load can be accommodated the same as in U.S. Pat. No. 5,079,499 which has been incorporated herein by reference; this requires access to corresponding nodes of both winding circuits within a respective winding group so that the two winding circuits can be connected in electrical parallel to provide a respective full load rated three-phase output.

Although different primary winding configurations are used in the transformers 8, 10 for the FIG. 3 and FIG. 4 implementations of the preferred embodiment, the secondary winding configurations for the transformers 8, 10 are identical. This simplifies the transformers and facilitates the manufacturing of the transformers 8, 10 because the conductor material used in the secondaries is typically larger and more difficult to wind than is the material used in the primaries.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. An apparatus for providing multiple, phase-shifted power outputs, comprising:

input means for connecting to a multi-phase power source having a predetermined number of phases and for causing a first phase shift in response to current flow from the power source through said input means; and output means, responsive to current flow through said input means, for causing a second phase shift and for providing multiple power outputs of different phases in response to said first and second phase shifts, said output means including at least two closed circuit winding groups wherein one closed circuit winding group is electrically phase shifted relative to another closed circuit winding group by said first phase shift and wherein each closed circuit winding group provides respective phase power outputs electrically phase shifted within the respective closed circuit winding group by said second phase shift.

2. An apparatus as defined in claim 1, wherein said first phase shift is about thirty electrical degrees and said second phase shift is about fifteen electrical degrees.

3. An apparatus as defined in claim 1, wherein said input means includes:

a first primary winding circuit electromagnetically coupled with one of said closed circuit winding groups; and a second primary winding circuit electromagnetically coupled with another of said closed circuit winding groups.

4. An apparatus as defined in claim 3, wherein each said closed circuit winding group includes a respective single closed secondary winding circuit.

5. An apparatus as defined in claim 3, wherein each said closed circuit winding group includes a respective pair of electrically isolated closed secondary winding circuits.

6. An apparatus as defined in claim 1, wherein each said closed circuit winding group includes a respective single closed secondary winding circuit.

7. An apparatus as defined in claim 1, wherein each said closed circuit winding group includes a respective pair of electrically isolated closed secondary windings circuits.

8. An apparatus for providing multiple, phase-shifted power outputs, comprising:

primary winding means for connecting to a multi-phase power source having a predetermined number of phases and for causing a first phase shift in response to current flow from the power source through said primary winding means; and two, and only two, secondary polygon-vector winding groups, responsive to current flow through said primary winding means, for causing a second phase shift and for providing multiple power outputs having different phases, wherein the power outputs from one polygon-vector winding group are electrically phase shifted relative to the power outputs from the other polygon-vector winding group by said first phase shift and wherein each polygon-vector winding group provides respective phase power outputs electrically phase shifted within the respective polygon-vector winding group by said second phase shift.

9. An apparatus as defined in claim 8, wherein said first phase shift is about thirty electrical degrees and said second phase shift is about fifteen electrical degrees.

10. An apparatus as defined in claim 8, wherein said primary winding means includes:

a first primary winding circuit electromagnetically coupled with one of said polygon-vector winding groups; and a second primary winding circuit electromagnetically coupled with the other of said polygon-vector winding groups.

11. An apparatus as defined in claim 10, wherein each said polygon-vector winding group includes a respective single polygon-vector secondary winding circuit.

12. An apparatus as defined in claim 10, wherein each said polygon-vector winding group includes a respective pair of electrically isolated polygon-vector secondary winding circuits.

13. An apparatus as defined in claim 8, wherein each said polygon-vector winding group includes a respective single polygon-vector secondary winding circuit.

14. An apparatus as defined in claim 8, wherein each said polygon-vector winding group includes a respective pair of electrically isolated polygon-vector secondary winding circuits.

15. An apparatus for providing a twelve-phase power output, comprising first and second transformers each providing a respective set of six different phase outputs, wherein:

said first transformer includes:

a delta-connected primary winding circuit;

means for connecting said delta-connected primary winding circuit to a three-phase power source; and a polygon-vector secondary winding group electromagnetically coupled with said delta connected primary winding circuit, said secondary winding group of said first transformer providing two three-phase outputs shifted about fifteen electrical degrees relative to each other in response to three-phase current flow through said delta connected primary winding circuit from the three-phase power source; and said second transformer includes:

a wye-connected primary winding circuit;

means for connecting said wye-connected primary winding circuit to the three-phase power source; and a polygon-vector secondary winding group electromagnetically coupled with said wye-connected primary winding circuit, said secondary winding group of said second transformer providing two three-phase outputs shifted about fifteen electrical degrees relative to each other in response to three phase current flow through said wye-connected primary winding circuit from the three-phase power source, and wherein said two three-phase outputs of said second transformer are shifted about thirty electrical degrees relative to said two three-phase outputs of said first transformer.

16. An apparatus as defined in claim 15, wherein each said secondary winding group includes a respective single closed secondary winding circuit.

17. An apparatus as defined in claim 16, wherein each respective single closed secondary winding circuit includes six series-connected windings.

18. An apparatus as defined in claim 15, wherein each said secondary winding group includes a respective pair of electrically isolated closed secondary winding circuits.

19. An apparatus as defined in claim 18, wherein each closed secondary winding circuit of each said respective pair includes six series-connected windings.

* * * * *

UNITED STATES PATENT AND TRADEMARK OFFICE
CERTIFICATE OF CORRECTION

Patent No.: 5,731,971

Dated: March 24, 1998

Inventor(s): Donald W. Owen

It is certified that errors appear in the above-identified patent and that said Letters Patent is hereby corrected as shown below:

```
Column 8, line 21, change "delta connected" to
--delta-connected--.

Column 8, line 26, change "delta connected" to
--delta-connected--.

Column 8, line 37, change "three phase" to
--three-phase--.
```

Signed and Sealed this

Eighth Day of December, 1998

Attest:

BRUCE LEHMAN

Attesting Officer

Commissioner of Patents and Trademarks